United States Patent
Uchida et al.

(10) Patent No.: US 7,754,306 B2
(45) Date of Patent: Jul. 13, 2010

(54) OPTICAL INFORMATION RECORDING MEDIUM

(75) Inventors: Mamoru Uchida, Gunma (JP);
Tomonori Endo, Gunma (JP); Yuaki Shin, Gunma (JP); Yoshimasa Shimomura, Gunma (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 617 days.

(21) Appl. No.: 11/725,274

(22) Filed: Mar. 19, 2007

(65) Prior Publication Data

US 2007/0248775 A1    Oct. 25, 2007

(30) Foreign Application Priority Data

Mar. 20, 2006  (JP)  .............................. 2006-075952

(51) Int. Cl.
*B32B 3/02*    (2006.01)

(52) U.S. Cl. .................. 428/64.1; 428/64.4; 430/270.11

(58) Field of Classification Search ...................... None
See application file for complete search history.

(56) References Cited

U.S. PATENT DOCUMENTS

| | | | |
|---|---|---|---|
| 2004/0167025 A1* | 8/2004 | Usami ........................ 503/201 |
| 2005/0064114 A1* | 3/2005 | Matsubaguchi et al. .. 428/32.24 |
| 2005/0186331 A1* | 8/2005 | Fujimoto et al. .............. 427/66 |
| 2006/0204705 A1* | 9/2006 | Uchida et al. .............. 428/64.4 |
| 2007/0048467 A1* | 3/2007 | Kaneno et al. ........... 428/32.31 |
| 2007/0248775 A1* | 10/2007 | Uchida et al. ............ 428/32.31 |

FOREIGN PATENT DOCUMENTS

| | | |
|---|---|---|
| EP | 1304691 A2 | 4/2003 |
| EP | 1519370 A1 | 3/2005 |
| EP | 1602506 A2 | 12/2005 |
| JP | 2002-237103 | 8/2002 |
| JP | 2003-123323 | 4/2003 |
| JP | 2004-249610 | 9/2004 |
| JP | 2007-052892 * | 3/2007 |

OTHER PUBLICATIONS

Co-pending U.S. Appl. No. 11/725,274.

* cited by examiner

*Primary Examiner*—Elizabeth Mulvaney
(74) *Attorney, Agent, or Firm*—Law Office of Katsuhiro Arai

(57) ABSTRACT

One inventive aspect relates to an optical information recording medium which has a high gloss and ensures, even after printing, a gloss substantially equal to that before the printing, and which can increase quality of a printed image. The optical information recording medium has an ink absorbing layer made of a porous film, which is formed on an outermost layer on a surface thereof on the side opposed to a recording/reproducing surface of the optical information recording medium. The optical information recording medium has a surface gloss of the ink absorbing layer is about 25 or more in terms of 60° specular gloss before printing and has a level after the printing which is equal to or higher than a level before the printing.

17 Claims, 1 Drawing Sheet

OPTICAL INFORMATION RECORDING MEDIUM

RELATED APPLICATIONS

This application is related to U.S. application Ser.No. 11/725,367, filed on the same day herewith and titled "OPTICAL INFORMATION RECORDING MEDIUM," which is hereby incorporated by reference.

BACKGROUND OF THE INVENTION

1. Field of the Invention

The present invention relates to an optical information recording medium having an ink absorbing layer, in which printing can be directly made on a surface (label surface) opposed to a recording/reproducing surface of the optical information recording medium.

2. Description of the Related Technology

An optical information recording medium having a label surface, in which an ink absorbing layer is formed to enable printing to be directly made on the medium by, e.g., an ink jet printer, (i.e., the so-called printable product), has been used more extensively.

Ink absorbing layers of general printable products have mat surfaces with no gloss. Recently, however, a printable product having a high gloss has been marketed to provide a higher-quality appearance by adding a new property of gloss to the ink absorbing layer.

Further, there is known an invention in which the surface gloss of an ink absorptive resin layer of a printable optical recording medium is specified and the surface roughness of the ink absorptive resin layer is controlled to be 0.40 µm or less so that a printed image has a sharper appearance (see Japanese Unexamined Patent Application Publication No. 2002-237103).

The invention of Japanese Unexamined Patent Application Publication No. 2002-237103 takes into account the surface gloss of an ink absorptive resin layer, but it includes no particular description about a gloss level after printing of an image. Regarding high quality after printing of an image (i.e., realization of high-definition design), Japanese Unexamined Patent Application Publication No. 2002-237103 states, "By forming the outermost layer on the label surface of the optical recording medium to have a small roughness, a gloss and ink absorptivity, the optical recording medium having a glossy printable layer can be provided which enables users to optionally print a high-definition image with quality comparable to that of a photo on the medium surface by using an ink jet printer or a thermal transfer printer." (Paragraph [0012]) Further, regarding features of such an optical recording medium, Japanese Unexamined Patent Application Publication No. 2002-237103 states, "The present invention resides in the optical recording medium featured by having, as the outermost layer, an ink absorptive resin layer with a 60° specular gloss of 30 to 150 at its surface. Also, the present invention resides in the optical recording medium featured by having, as the outermost layer, an ink absorptive resin layer with a surface roughness (Ra) of 0.40 µm or less." (Paragraph [0013])

The marketed printable products having a high gloss include ink absorptive resin layers with a 60° specular gloss of 30 to 150 at their surfaces and a surface roughness (Ra) of 0.40 µm or less. In other words, the properties of the marketed printable products are just matched with the technical features disclosed in Japanese Unexamined Patent Application Publication No. 2002-237103.

However, when images are actually printed on those products, it often occurs that a printed area is apt to loose the gloss and a large difference in gloss is generated between the printed area and a not-printed area, thus resulting in an image finished with poor quality.

Stated another way, the product disclosed in Japanese Unexamined Patent Application Publication No. 2002-237103 and the other known gloss printable products cannot realize high-quality printing from the practical point of view.

Meanwhile, there is also known a product of the type that paper having a gloss (so-called glossy paper) can be pasted onto a label surface. Such a product realizes a glossy and high-quality image by allowing the glossy paper (image), which is printed by a printer or the like, to be pasted onto the label surface.

Thus, an improvement of printing quality has been tried by controlling a gloss level of the printable product.

Printing an image on glossy paper can realize high-quality printing with less disappearance of gloss even after the printing. However, such a method has a disadvantage in that the specific functions (optical recording and reproducing) of the optical information recording medium are seriously impeded in some cases. More specifically, the medium is susceptible to wobbling in rotation due to, e.g., a misalignment of the pasted label and a deviation in weight distribution accuracy of the paper itself. Also, the medium is susceptible to warp due to deformations (such as expansion and contraction) of the label. Those undesirable events tend to cause errors during the process of recording and reproducing. Further, there is a risk that the pasted label is half or fully peeled off. In such a case, the half or fully peeled-off label may be caught in a drive unit, thus leading to damage of a disk and/or a drive.

In the situations described above, a technique capable of keeping sharpness of a printed image without loosing the gloss in appearance even after the printing is demanded in the printable product represented by the optical information recording medium in which the ink absorbing layer is directly formed on the label surface without pasting the glossy paper.

SUMMARY OF CERTAIN INVENTIVE ASPECTS

With the view of overcoming the above-described problem that the ink absorbing layer directly formed on the optical information recording medium has a superior gloss, but the gloss tends to disappear after the printing, an object of certain inventive aspects is to provide an optical information recording medium which has a high gloss and ensures, even after printing, a gloss substantially equal to that before the printing, and which can increase quality of a printed image.

The above object is achieved by features given below.

(1) An optical information recording medium having an ink absorbing layer made of a porous film, which is formed on an outermost layer on a surface thereof on the side opposed to a recording/reproducing surface of the optical information recording medium, wherein a surface gloss of the ink absorbing layer is 25 or more in terms of 60° specular gloss before printing and has a level after the printing which is equal to or higher than a level before the printing.

(2) In the optical information recording medium in (1), a difference in the surface gloss of the ink absorbing layer between before and after the printing is in the range of 0 to 20 in terms of the 60° specular gloss.

(3) In the optical information recording medium in (2), the difference in the surface gloss of the ink absorbing layer between before and after the printing is in the range of 0 to 15 in terms of the 60° specular gloss.

(4) In the optical information recording medium in any one of (1) to (3), the surface gloss of the ink absorbing layer before the printing is 30 or more in terms of the 60° specular gloss.

(5) In the optical information recording medium in any one of (1) to (4), the surface gloss of the ink absorbing layer before the printing is less than 70 in terms of 60° specular gloss.

(6) In the optical information recording medium in any one of (1) to (5), a surface roughness (Ra) of the ink absorbing layer is in the range of 0.4 to 0.9 μm.

(7) In the optical information recording medium in any one of (1) to (6), wherein the porous film is a coating film made of primarily inorganic powders.

(8) In the optical information recording medium in (7), the coating film is a coating film formed by joining inorganic powders, which are produced by a vapor phase process, together using a resin binder.

(9) In the optical information recording medium in (7) or (8), the coating is formed by a spin coating process.

(10) In the optical information recording medium in any one of (1) to (9), the ink absorbing layer of the optical information recording medium is formed on a white ink underlying layer which is formed on a surface of a protective layer for a main body of the optical information recording medium.

The 60° specular gloss was measured in conformity with JIS Z 8741 by using a measuring device (PG-IM) made by Nippon Denshoku Industries Co., Ltd.

More specifically, the specular gloss was measured in conformity with JIS Z 8741 by using the above-mentioned measuring device through the steps of entering a pencil of light with a prescribed opening angle to a sample surface at a prescribed incident angle, measuring a pencil of light, which is reflected in the direction of specular reflection and has a prescribed opening angle, by a photo detector, and calculating a gloss level of the sample surface based on the gloss level of a reference surface and the detected intensity of the pencil of light specularly reflected from the reference surface. The 60° specular gloss means a gloss level measured at the incident angle of 60±0.2°.

Printing (ink used in a printer) was evaluated for the case of no printing (blank), C (cyan), M (magenta), and Y (yellow) with a printing pattern shown in FIG. 1.

The evaluation was made on five types of printers, i.e., EPSON (PMG800), Canon (PIXUS990i), Rimage (480i), MicroBoards (PrintFactory), Primera (SignatureIV). A printing mode was set to "High image-quality adaptable CD/DVD mode" (PMG800), "Recommended printable" (PIXUS990i), "BEST" (480i), "PhotoBEST" (PrintFactory), and "BEST600" (SignatureIV).

According to one inventive aspect, by setting the 60° specular gloss before the printing to be 25 or more, the ink absorbing layer having a visually sensed gloss in itself is obtained. In addition, by setting the gloss after the printing to be equal to or higher than that before the printing, particularly, by holding the 60° specular gloss after the printing to be within the range of +20 to 0 in comparison with that before the printing, a difference in the visually sensed gloss between a printed area and a not-printed area is hardly perceived, and printing quality with a high visually sensed gloss can be realized.

DESCRIPTION OF CERTAIN ILLUSTRATIVE EMBODIMENTS

Figure 1:
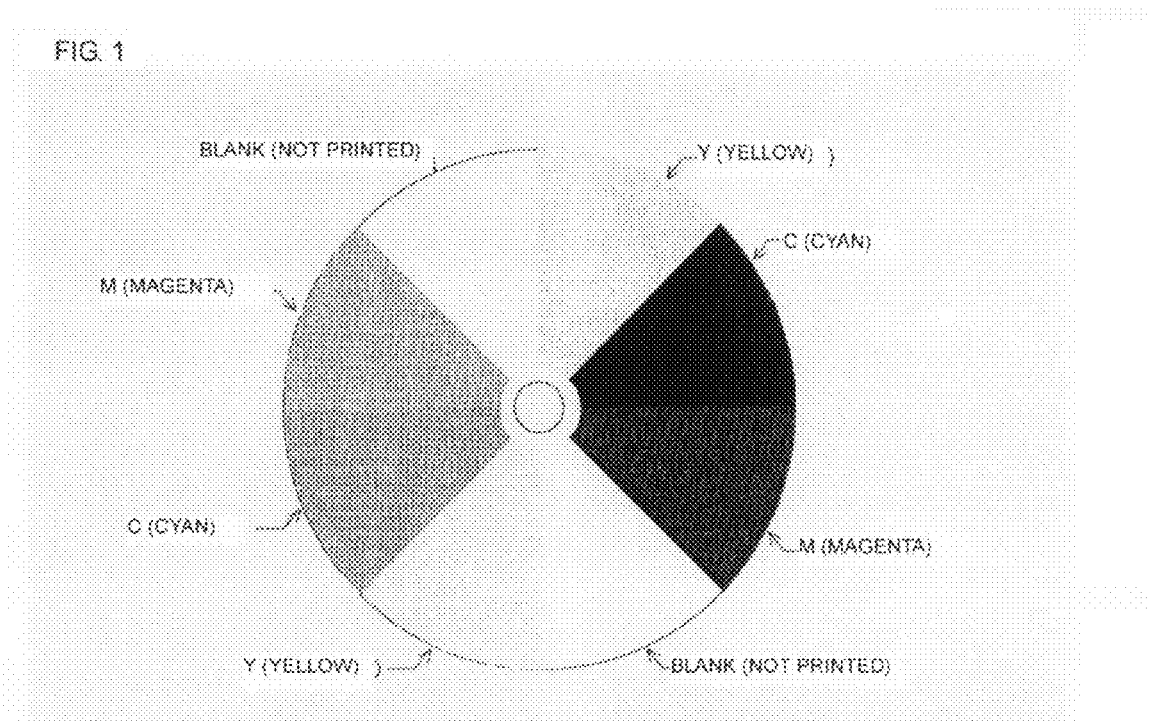
FIG. 1 shows a printing pattern which was printed for gloss measurement by using an ink jet printer.

Various aspects and features of the invention will become more fully apparent from the following description and appended claims taken in conjunction with the foregoing drawings. In the drawings, like reference numerals indicate identical or functionally similar elements. In the following description, specific details are given to provide a thorough understanding of the disclosed methods and apparatus. However, it will be understood by one of ordinary skill in the technology that the disclosed systems and methods may be practiced without these specific details.

Figure 2:
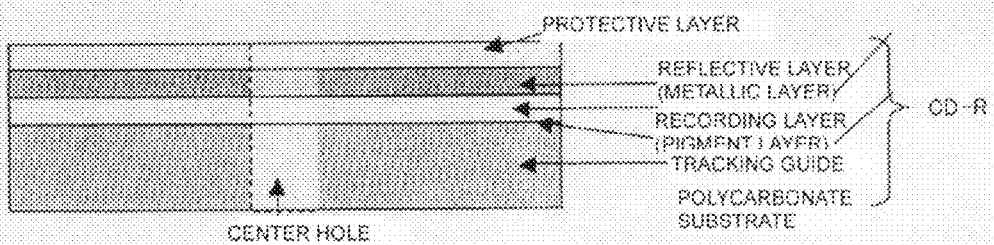
FIG. 2 shows a basic structure of a CD-R in which is employed an ink absorbing layer according to one embodiment.

FIG. 2 shows a basic structure of a CD-R in which is employed an ink absorbing layer according to one embodiment.

A tracking guide is formed in a light-transmissive substrate made of polycarbonate, and a recording layer made of a pigment, e.g., cyanine, is formed on the surface of the substrate in which is formed the tracking guide. A reflective layer made of a metal, e.g., silver, is formed on the recording layer, and a protective layer made of, e.g., an ultraviolet curable resin is printed on the recording layer.

Figure 3:
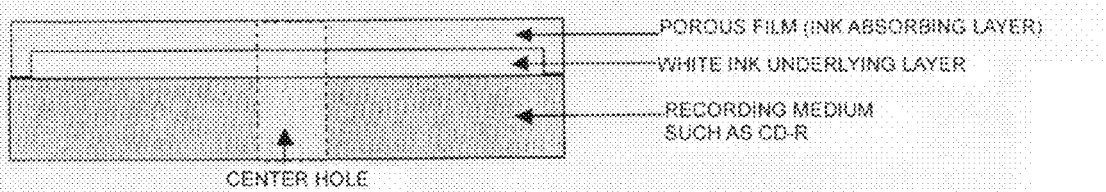
FIG. 3 shows a basic structure of an optical information recording medium according to one embodiment.

FIG. 3 shows a basic structure of an optical information recording medium according to one embodiment.

A white ink underlying layer is formed on a main body of a recording medium having the above-mentioned structure, such as a CD-R, and an ink absorbing layer made of a porous film is formed on the white ink underlying layer.

In a basic structure of a DVD-R in which is employed the ink absorbing layer, two polycarbonate substrates each having a thickness of 0.6 mm are bonded to each other. According to one embodiment, the white ink underlying layer is formed on one of the polycarbonate substrates on the side where the recording layer is not formed. Stated another way, in the CD-R in which is employed the ink absorbing layer according to one embodiment, the protective layer is formed under the white ink underlying layer. In the DVD-R, however, the polycarbonate substrate is positioned under the white ink underlying layer and has the function as the protective layer.

The optical information recording medium according to one embodiment is featured in that a surface gloss of the ink absorbing layer is 25 or more in terms of 60° specular gloss before printing and has a level after the printing which is equal to or higher than a level before the printing.

If the surface gloss of the ink absorbing layer is less than 25 in terms of the 60° specular gloss, an unsatisfactory result is led in that an image has a low visually-sensed gloss. From the viewpoint of increasing the visually sensed gloss, therefore, the surface gloss of the ink absorbing layer is preferably 30 or more in terms of the 60° specular gloss.

On the other hand, if the gloss is reduced after the printing even when the surface gloss of the ink absorbing layer before the printing is 25 or more in terms of the 60° specular gloss, an unsatisfactory result is led in that an image has flicker and low sharpness.

Particularly, if the 60° specular gloss is 70 or more, an image with a very high visually-sensed gloss is obtained, but the gloss is extremely reduced after the printing in many cases.

For those reasons, the surface gloss of the ink absorbing layer before the printing is preferably not less than 25 and less than 70, more preferably 30 to 40, in terms of the 60° specular gloss.

In one embodiment, to obtain a sharp image free from flicker, the 60° specular gloss of the surface of the ink absorbing layer after the printing is preferably held within the range of +20 to 0 in comparison with that before the printing.

Even when the surface gloss of the ink absorbing layer is 25 or more in terms of the 60° specular gloss before the printing and has a level after the printing which is higher than a level before the printing, an unsatisfactory image with flicker and low sharpness is resulted in some cases if a difference in the surface gloss of the ink absorbing layer between before and after the printing exceeds 20 in terms of the 60° specular gloss.

When the difference in the surface gloss of the ink absorbing layer between before and after the printing is in the range of 0 to 15 in terms of the 60° specular gloss, a more satisfactory result is obtained in that an image is free from flicker and has very high sharpness.

The surface gloss of the ink absorbing layer before the printing depends on a surface roughness (Ra) of the ink absorbing layer. In one embodiment, the surface roughness (Ra) of the ink absorbing layer is preferably 0.9 μm or less. If it exceeds 0.9 μm, an unsatisfactory result is led in that the surface gloss before the printing becomes less than 25 in terms of the 60° specular gloss.

If the surface roughness (Ra) is less than 0.4 μm, an unsatisfactory result is led in that the surface gloss has a high level, but it is extremely reduced after the printing. For those reasons, the surface roughness (Ra) of the ink absorbing layer is preferably in the range of 0.4 to 0.9 μm.

In one embodiment, the porous film forming the ink absorbing layer is preferably a coating film made of primarily inorganic powders which are joined together using a resin binder or the like. More preferably, the porous film is a coating film formed by joining inorganic powders which are produced by a vapor phase process, e.g., vapor-grown alumina powders, together using a resin binder.

Vapor-grown alumina means alumina powders produced by vaporizing, e.g., aluminum chloride or metal aluminum, and oxidizing it in vapor phase with an oxidizing gas. Inorganic powders can also be produced from other inorganic materials, such as silica, by the vapor phase process in a similar manner.

A coating liquid containing the vapor-grown alumina powders (vapor-grown inorganic powders) can have higher viscosity than a coating liquid containing ordinary wet-process alumina (water-based inorganic powders). Therefore, a thickness of the coating layer formed by a spin coating process, for example, can be increased and the surface gloss of the ink absorbing layer can be controlled by adjusting the thickness of the porous film.

In addition, the surface gloss of the ink absorbing layer can also be controlled by adjusting the particle size of the inorganic powder such as the vapor-grown inorganic powder. The inorganic powder having the particle size (primary particle diameter) of 0.005 to 0.2 μm can be used.

If the particle size is less than 0.005 μm, voids in the porous film tend to be fully filled with fine particles, thus resulting in a disadvantage that ink absorptivity is reduced. If the particle size exceeds 0.2 μm, light passing through the porous film tends to be scattered, thus causing a risk that transparency of the porous film is lost and printing performance (color development) is deteriorated. For those reasons, the particle size is preferably held within the above-mentioned range.

Examples of the resin binder used to join the inorganic powders together include polyvinyl alcohol, polyethylene oxide, polyvinyl methyl ether, hydroxyethyl cellulose, and carboxymethyl cellulose. When polyvinyl alcohol is used, the coating liquid can be obtained by preparing an aqueous solution thereof and dispersing the inorganic powders in the aqueous solution.

The coating liquid may be added with other components for improving fixation of ink, such as a zirconium compound.

In the coating liquid, preferably, 400 to 2000 weight parts of the inorganic powders are mixed with respect to 100 weight parts of the resin. If the inorganic powders are mixed in amount less than the lower limit, voids in the porous film tend to be fully filled with the resin, thus resulting in a disadvantage that ink absorptivity is reduced. If the inorganic powders are mixed in amount more than the upper limit, the amount of the resin for joining the inorganic powders together is reduced, thus causing a risk that a brittle porous film is formed.

The viscosity of the coating liquid is preferably adjusted to the range of 500 to 10,000 mPa·s at 25° C. If the viscosity is less than the lower limit, it is difficult to form the porous film having a predetermined thickness, thus resulting in a disadvantage that ink absorptivity is reduced. If the viscosity exceeds the upper limit, there is a risk of such a coating failure that the coating liquid cannot be smoothly spread over a disk in the coating process.

The thickness of a film formed by applying the coating liquid is preferably in the range of 5 to 100 μm and more preferably 15 to 50 μm. If the film thickness is less than the lower limit, there is a risk that ink is not completely absorbed, thus resulting in a printing failure such as a blur. If the film thickness exceeds the upper limit, problems may arise in that errors tend to occur in the recording/reproducing process due to a warp of the disk, and that economical efficiency is deteriorated because the coating liquid is used in a larger amount.

Further, the surface gloss of the ink absorbing layer can be controlled to fall within the desired scope by adjusting the content of the inorganic powders and the thickness of the coating film to fall within the above-described ranges.

The ink absorbing layer (porous film) is preferably formed on an underlying layer which is formed on a surface of a protective layer for a main body of a recording medium, e.g., a CD-R. By forming the underlying layer as a white ink layer, in particular, the metal color of the layer positioned below the protective layer is concealed by the white ink layer so that a white background is obtained. Therefore, color development of the ink having reached the underlying layer after permeation through the porous film laminated on a surface of the underlying layer can be improved, and an image having higher sharpness can be obtained.

Examples of the optical information recording medium according to the foregoing embodiments will be described below.

EXAMPLE 1

First, 1.0 part of a 20-wt % aqueous solution of nitric acid and 0.2 part of lactic acid were added to 72.0 parts of a 6-wt % aqueous solution of polyvinyl alcohol (average degree of polymerization: 5,000 and average degree of saponification: 88 mol %). While sufficiently mixing the mixed solution under shaking, 25.8 parts of vapor-grown alumina powders (Alu-C made by Aerosil Co., Ltd., primary particle diameter: 0.013 μm) were added, followed by dispersion continued for one day using a ball mill with zirconia balls put in the solution. Then, 1.0 part of an aqueous solution prepared by dissolving 0.25 part of zirconium oxychloride octahydrates therein was added to the above solution and subjected to dispersion continued for one day using the ball mill, whereby a coating liquid A was obtained. The viscosity of the coating liquid A was 3,660 (mPa·s) at 25° (measurement conditions: viscometer VISCONIC EHD made by Tokyo Keiki Co., Ltd. and the number of revolutions of 100 rpm).

A light-transmissive substrate made of polycarbonate and having an outer diameter of 120 mmϕ, an inner diameter of 15 mmϕ, and a thickness of 1.2 mm was prepared. In the substrate, groove-shaped tracking guides having a half-value breadth of 0.5 μm, a depth of 0.2 μm, and a track pitch of 1.6 μm were formed in an area with a diameter ranging from 46 to 117 mmϕ.

On a surface of the light-transmissive substrate having the tracking guides formed therein, a cyanine pigment dissolved in a solvent was spin-coated and then dried. A recording layer formed of a pigment film with an average thickness of 70 nm was thereby formed. Silver was coated on the recording layer by sputtering to form a reflective layer with a thickness of 100 nm. Then, an ultraviolet curable resin was coated on the reflective layer by a spin coating process, and an ultraviolet ray was irradiated to the coated resin for curing it, whereby a protective layer with a thickness of 10 μm was formed. As a result, a CD-R was produced.

Further, a white paint UVSP20404ZTWHITE made by Teikoku Painting Inks Co., Ltd. was printed on the protective layer by a screen printing process. An ultraviolet ray was irradiated to the protective layer for curing it, whereby a white ink underlying layer with a thickness of 10 μm was formed.

Subsequently, the coating liquid A was spin-coated on the CD-R having the white ink underlying layer formed as described above, to thereby form a coating film. The coating film was exposed to temperature of 60° for drying it, whereby a porous film with a thickness of 25 μm was formed. As a result, an ink absorbing layer made up of the white ink underlying layer and the porous layer laminated on this order was formed on the surface of the protective layer.

EXAMPLE 2

An ink absorbing layer was formed in the same manner as Example 1 except that the thickness of the porous layer was set to 35 μm instead of 25 μm.

EXAMPLE 3

An ink absorbing layer was formed in the same manner as Example 1 except that the mixed amounts of the 6-wt % aqueous solution of polyvinyl alcohol and the vapor-grown alumina powders were changed respectively to 70.0 parts and 27.8 parts.

EXAMPLE 4

An ink absorbing layer was formed in the same manner as Example 1 except that a DVD-R was produced instead of the CD-R.

EXAMPLE 5

An ink absorbing layer was formed in the same manner as Example 1 except that vapor-grown alumina powders SpectrAl 51 (primary particle diameter: 0.020 μm) made by Cabot Corporation) were used and the thickness of the porous layer was set to 30 μm instead of 25 μm.

COMPARATIVE EXAMPLE 1

A swelling printable product was used as an optical information recording medium.

COMPARATIVE EXAMPLE 2

One glossy-type swelling printable product available in the market was used as an optical information recording medium.

COMPARATIVE EXAMPLE 3

Another glossy-type swelling printable product available in the market was used as an optical information recording medium.

COMPARATIVE EXAMPLE 4

An ink absorbing layer was formed in the same manner as Example 1 except that the vapor-grown alumina powders SpectrAl 51 (primary particle diameter: 0.020 μm) made by Cabot Corporation) were used and the thickness of the porous layer was set to 35 μm instead of 25 μm.

The printing pattern, shown in FIG. 1, was printed on the surface of the ink absorbing layer of the optical information recording medium produced according to each of Examples 1-5 and Comparative Examples 1-4 with water-based color inks in three colors, i.e., C (cyan), M (Magenta) and Y (Yellow), by using the ink jet printers.

Table 1, given below, lists the measured results of the surface gloss of each ink absorbing layer before the printing and the difference in the surface gloss of each ink absorbing layer between before and after the printing, along with the determination results of image flicker and visually sensed gloss.

The method for determining the image flicker and the visually sensed gloss, shown in Table 1, was performed with ratings using symbols as follows.

Regarding the image flicker:
⊙=image with no flicker and very high sharpness
○=image with slight flicker but high sharpness
Δ=image with flicker and low sharpness
×=image with much flicker and no sharpness Regarding visually sensed gloss:
⊙=image with a high visually sensed gloss
○=image with a visually sensed gloss
Δ=image with a low visually sensed gloss
×=image with no visually sensed gloss

TABLE 1

| | Surface Roughness (Ra: μm) | Printer | 60° C. Gloss cyan | yellow | magenta | blank | Difference in Gloss (max) | Image Flicker | Sensed Gloss |
|---|---|---|---|---|---|---|---|---|---|
| Ex. 1 | 0.51 | ① PMG800 | 46.3 | 44.3 | 45.8 | | 10.8 | ☉ | ☉ |
| | | ② 990i | 44.3 | 44.0 | 46.7 | | 11.2 | ☉ | ☉ |
| | | ③ Signature IV | 37.5 | 40.3 | 42.5 | 35.5 | 7.0 | ☉ | ☉ |
| | | ④ PrintFactory | 38.3 | 43.4 | 47.1 | | 11.6 | ☉ | ☉ |
| | | ⑤ 480i | 37.5 | 42.4 | 45.8 | | 10.3 | ☉ | ☉ |
| Ex. 2 | 0.53 | ① | 43.5 | 42.1 | 43.1 | | 12.1 | ☉ | ☉ |
| | | ② | 42.2 | 40.9 | 43.0 | | 11.6 | ☉ | ☉ |
| | | ③ | 40.8 | 39.9 | 41.4 | 31.4 | 10.0 | ☉ | ☉ |
| | | ④ | 40.5 | 43.3 | 45.6 | | 14.2 | ☉ | ☉ |
| | | ⑤ | 40.9 | 42.6 | 44.4 | | 13.0 | ☉ | ☉ |
| Ex. 3 | 0.67 | ① | 44.5 | 42.8 | 44.0 | | 15.6 | ○ | ☉ |
| | | ② | 42.9 | 42.7 | 44.6 | | 15.7 | ○ | ☉ |
| | | ③ | 39.9 | 39.4 | 40.7 | 28.9 | 11.8 | ☉ | ☉ |
| | | ④ | 39.0 | 44.1 | 47.2 | | 18.3 | ○ | ☉ |
| | | ⑤ | 38.2 | 42.1 | 44.9 | | 16.0 | ○ | ☉ |
| Ex. 4 | 0.48 | ① | 48.3 | 46.9 | 48.8 | | 11.9 | ☉ | ☉ |
| | | ② | 47.2 | 46.8 | 49.0 | | 12.1 | ☉ | ☉ |
| | | ③ | 45.1 | 43.1 | 44.1 | 36.9 | 8.2 | ☉ | ☉ |
| | | ④ | 40.5 | 47.5 | 49.7 | | 12.8 | ☉ | ☉ |
| | | ⑤ | 41.4 | 43.9 | 49.5 | | 12.6 | ☉ | ☉ |
| Ex. 5 | 0.86 | ① | 46.8 | 44.7 | 45.7 | | 20.7 | Δ | ○ |
| | | ② | 45.2 | 44.1 | 46.2 | | 20.1 | Δ | ○ |
| | | ③ | 38.7 | 40.0 | 41.3 | 26.1 | 15.2 | ○ | ○ |
| | | ④ | 37.5 | 44.4 | 46.9 | | 20.8 | Δ | ○ |
| | | ⑤ | 37.0 | 42.4 | 45.5 | | 19.4 | ○ | ○ |
| Com. Ex. 1 | 2.21 | ① | 3.9 | 3.1 | 8.1 | | 2.5 | Δ | X |
| | | ② | 4.0 | 4.1 | 7.1 | | −1.6 | Δ | X |
| | | ③ | 5.4 | 6.1 | 6.2 | 5.6 | 0.6 | Δ | X |
| | | ④ | 3.4 | 2.8 | 3.9 | | −2.8 | Δ | X |
| | | ⑤ | 4.3 | 3.6 | 5.0 | | −2.0 | Δ | X |
| Com. Ex. 2 | 0.33 | ① | 74.1 | 74.4 | 75.1 | | −16.0 | X | ○ |
| | | ② | 74.1 | 73.7 | 83.4 | | −16.4 | X | ○ |
| | | ③ | 48.4 | 48.8 | 49.0 | 90.1 | −41.7 | X | ○ |
| | | ④ | 44.1 | 75.2 | 75.2 | | −46.0 | X | ○ |
| | | ⑤ | 47.9 | 66.6 | 70.4 | | −42.2 | X | ○ |
| Com. Ex. 3 | 0.29 | ① | 63.0 | 74.5 | 77.4 | | −27.0 | X | ○ |
| | | ② | 71.1 | 71.0 | 73.7 | | −19.0 | X | ○ |
| | | ③ | 54.3 | 65.6 | 75.4 | 90.0 | −35.7 | X | ○ |
| | | ④ | 57.7 | 67.8 | 75.2 | | −32.3 | X | ○ |
| | | ⑤ | 47.8 | 58.8 | 68.0 | | −42.2 | X | ○ |
| Com. Ex. 4 | 0.88 | ① | 39.5 | 38.9 | 43.2 | | 20.1 | Δ | Δ |
| | | ② | 40.0 | 37.8 | 42.9 | | 19.8 | ○ | Δ |
| | | ③ | 36.9 | 37.3 | 35.7 | 23.1 | 14.2 | ☉ | Δ |
| | | ④ | 34.5 | 39.6 | 44.0 | | 20.9 | Δ | Δ |
| | | ⑤ | 35.4 | 43.8 | 42.3 | | 20.7 | Δ | Δ |

As seen from Table 1, the 60° gloss before the printing in Example 1 was as high as 35.5 and a difference between the gloss (in a right half of the printing pattern, i.e., in solid-printed areas with the water-based color inks in three colors, i.e., C (cyan), M (magenta) and Y (yellow)) after the printing and the gloss before the printing was +11.6 at maximum (with no reduction of the gloss after the printing). Also, no flicker was perceived on a printed image. A variation of the visually sensed gloss in grid-printed areas in a left half of the printing pattern was hardly recognized. In addition, a high-definition image was printed on the surface of the ink absorbing layer of each of other optical information recording media, which were produced in a similar manner, by using the ink jet printers. As a result, a difference in the visually sensed gloss over the entire printed image was small and satisfactory printing quality was obtained. Thus, a sharp image with brilliantly developed colors was obtained.

The 60° gloss before the printing in Example 2 was as high as 31.4 and a difference between the gloss (in a right half of the printing pattern) after the printing and the gloss before the printing was +14.2 at maximum. Also, no flicker was perceived on a printed image. A variation of the visually sensed gloss in grid-printed areas in a left half of the printing pattern was hardly recognized. In addition, a high-definition image was printed on the surface of the ink absorbing layer of each of other optical information recording media, which were produced in a similar manner, by using the ink jet printers. As a result, a difference in the visually sensed gloss over the entire printed image was small and satisfactory printing quality was obtained. Thus, a sharp image with brilliantly developed colors was obtained.

The 60° gloss before the printing in Example 3 was as high as 28.9 and a difference between the gloss (in a right half of the printing pattern) after the printing and the gloss before the printing was +18.3 at maximum. Also, no flicker was perceived on a printed image. A variation of the visually sensed gloss in grid-printed areas in a left half of the printing pattern was hardly recognized. In addition, a high-definition image was printed on the surface of the ink absorbing layer of each of other optical information recording media, which were produced in a similar manner, by using the ink jet printers. As a result, a difference in the visually sensed gloss over the entire printed image was small and satisfactory printing quality was obtained. Thus, a sharp image with brilliantly developed colors was obtained.

The 60° gloss before the printing in Example 4 was as high as 36.9 and a difference between the gloss (in a right half of the printing pattern) after the printing and the gloss before the printing was +12.8 at maximum. Also, no flicker was perceived on a printed image. A variation of the visually sensed gloss in grid-printed areas in a left half of the printing pattern was hardly recognized. In addition, a high-definition image was printed on the surface of the ink absorbing layer of each of other optical information recording media, which were produced in a similar manner, by using the ink jet printers. As a result, a difference in the visually sensed gloss over the entire printed image was small and satisfactory printing quality was obtained. Thus, a sharp image with brilliantly developed colors was obtained.

The 60° gloss before the printing in Example 5 was as high as 26.1 (over 25) and a difference between the gloss (in a right half of the printing pattern) after the printing and the gloss before the printing was +20.8 at maximum. A visually sensed gloss was observed, but a variation of the visually sensed gloss in grid-printed areas in a left half of the printing pattern was slightly recognized. When the difference in the gloss was 20 or less, a sharp image was obtained even with an appearance of slight flicker. In addition, a high-definition image was printed on the surface of the ink absorbing layer of each of other optical information recording media, which were produced in a similar manner, by using the ink jet printers. As a result, a slight difference in the visually sensed gloss was perceived over the entire printed image.

The 60° gloss before the printing in Comparative Example 1 was as low as 5.6 and a difference between the gloss (in a right half of the printing pattern) after the printing and the gloss before the printing was −2.8 at maximum. In other words, the gloss after the printing was reduced. For that reason, flicker was perceived on an image in grid-printed areas in a left half of the printing pattern. In addition, a high-definition image was printed on the surface of the ink absorbing layer of each of other optical information recording media, which were produced in a similar manner, by using the ink jet printers. As a result, a visually sensed gloss was not perceived over the entire printed image and the printed image had poor quality.

The 60° gloss before the printing in Comparative Example 2 was as very high as 90.1, while a difference between the gloss (in a right half of the printing pattern) after the printing and the gloss before the printing was as very large as −46.0 at maximum (with a reduction of the gloss after the printing). Further, a variation of the visually sensed gloss in grid-printed areas in a left half of the printing pattern and image flicker were recognized at a notable level. In addition, a high-definition image was printed on the surface of the ink absorbing layer of each of other optical information recording media, which were produced in a similar manner, by using the ink jet printers. As a result, the printing quality was poor due to a large variation of the visually sensed gloss over the entire printed image and notable image flicker. Thus, the printed image had no sharpness.

The 60° gloss before the printing in Comparative Example 3 was as very high as 90.0, while a difference between the gloss (in a right half of the printing pattern) after the printing and the gloss before the printing was as very large as −42.2 at maximum (with a reduction of the gloss after the printing). A variation of the visually sensed gloss in grid-printed areas in a left half of the printing pattern was also recognized at a notable level. In addition, a high-definition image was printed on the surface of the ink absorbing layer of each of other optical information recording media, which were produced in a similar manner, by using the ink jet printers. As a result, the printing quality was very poor due to a large variation of the visually sensed gloss over the entire printed image and notable image flicker. Thus, the printed image had no sharpness.

In Comparative Example 4, a difference between the gloss (in a right half of the printing pattern) after the printing and the gloss before the printing was +20.9 at maximum. Further, a variation of the visually sensed gloss in grid-printed areas in a left half of the printing pattern and image flicker were recognized. The gloss before the printing was as low as 23.1. In addition, a high-definition image was printed on the surface of the ink absorbing layer of each of other optical information recording media, which were produced in a similar manner, by using the ink jet printers. As a result, a difference in the visually sensed gloss was perceived over the entire printed image and the visually sensed gloss was poor in itself. Thus, the printed image had low quality.

As described above, it was confirmed that, in the optical information recording medium which satisfies requirements that the surface gloss of the ink absorbing layer is 25 or more in terms of 60° specular gloss before the printing and has a level after the printing which is equal to or higher than a level before the printing, a variation of the visually sensed gloss was hardly recognized, image flicker was not perceived (although slight flicker appeared in some cases), and a sharp image was obtained.

In particular, when the difference between the gloss before the printing and the gloss after the printing was 20 or less at maximum, the difference in the visually sensed gloss over the entire printed image was small, satisfactory printing quality was obtained, and a sharp image with brilliantly developed colors was obtained.

It is to be noted that Examples have been described above as employing the ink absorbing layer one embodiment in a CD-R and a DVD-R, the ink absorbing layer can also be applied to other types of optical information recording media, including media adaptable for a blue laser.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. An optical information recording medium comprising an ink absorbing layer made of a porous film, which is formed as an outermost layer on a surface thereof on the side opposed to a recording/reproducing surface of said optical information recording medium, wherein a surface gloss of said ink absorbing layer is about 25 or more in terms of 60° specular gloss before printing and has a level after the printing which is equal to or higher than a level before the printing, wherein a surface roughness (Ra) of said ink absorbing layer is in the range of 0.4 to 0.86 μm.

2. The optical information recording medium according to claim 1, wherein a difference in the surface gloss of said ink absorbing layer between before and after the printing is approximately in the range of 0 to 20 in terms of the 60° specular gloss.

3. The optical information recording medium according to claim 2, wherein the difference in the surface gloss of said ink absorbing layer between before and after the printing is approximately in the range of 0 to 15 in terms of the 60° specular gloss.

4. The optical information recording medium according to claim 1, wherein the surface gloss of said ink absorbing layer before the printing is approximately 30 or more in terms of the 60° specular gloss.

5. The optical information recording medium according to claim 1, wherein the surface gloss of said ink absorbing layer before the printing is less than about 70 in terms of 60° specular gloss.

6. The optical information recording medium according to claim 1, wherein said porous film is a coating film comprising primarily inorganic powders.

7. The optical information recording medium according to claim 6, wherein said coating film is formed by joining inorganic powders, which are produced by a vapor phase process, with a resin binder.

8. The optical information recording medium according to claim 6, wherein said coating film is formed by a spin coating process.

9. The optical information recording medium according to claim 6, wherein the thickness of the coating film is approximately 5 to 100 μm.

10. The optical information recording medium according to claim 6, wherein the thickness of the coating film is approximately 15 to 50 μm.

11. The optical information recording medium according to claim 6, wherein the coating film is formed by a coating solution comprising a gas phase method inorganic powder with a resin binder in a ratio by mass of approximately 4:1 to 20:1.

12. The optical information recording medium according to claim 6, wherein the coating film is formed by a coating solution comprising a gas phase method inorganic power, a resin binder, and zirconium compound.

13. The optical information recording medium according to claim 6, wherein the coating film is formed by a coating solution of viscosity approximately between 500 to 10,000 mPa·s when measured at 25° C.

14. The optical information recording medium according to claim 6, wherein the particle size of the inorganic powder ranges approximately from 0.005 to 0.2 μm.

15. The optical information recording medium according to claim 1, wherein said ink absorbing layer of the optical information recording medium is formed on a white ink underlying layer, the white ink underlying layer being formed on a surface of a protective layer for a main body of the optical information recording medium.

16. The optical information recording medium according to claim 1, wherein the porous film consists of a polymer component, inorganic powders, and additives, said polymer component being a resin binder selected from the group consisting of polyvinyl alcohol, polyethylene oxide, polyvinyl methyl ether, hydroxyethyl cellulose, and carboxymethyl cellulose.

17. The optical information recording medium according to claim 16, wherein the additives are a zirconium compound, nitric acid, and lactic acid.

* * * * *